Feb. 28, 1939. E. M. ÅGREN 2,148,975
FLEXIBLE SHAFT COUPLING
Filed Feb. 10, 1937 2 Sheets-Sheet 1
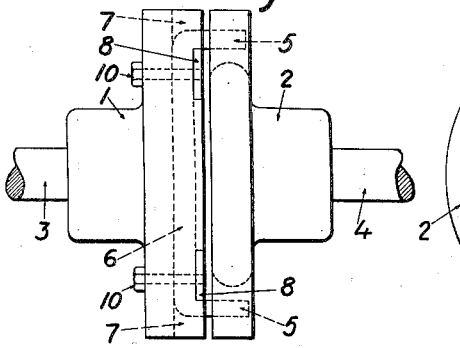
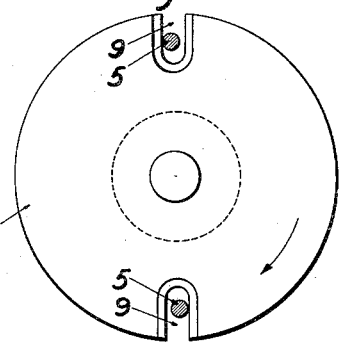
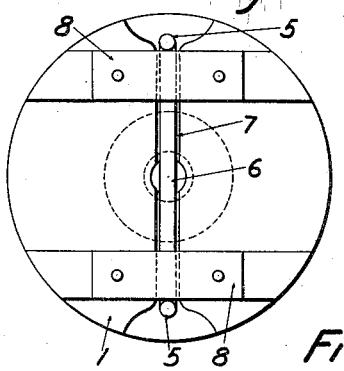
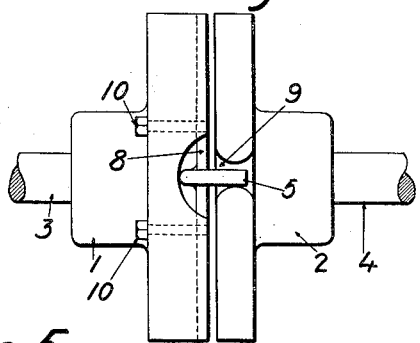
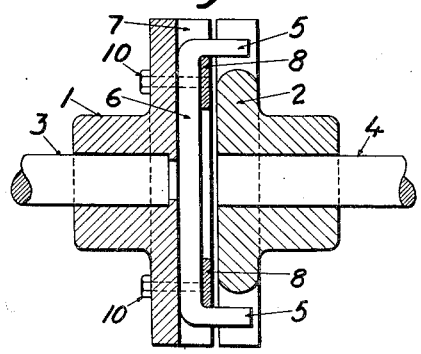
INVENTOR:
ERNST MALCUS ÅGREN
BY Haseltine Lake & Co.
ATTORNEYS Feb. 28, 1939. E. M. ÅGREN 2,148,975
FLEXIBLE SHAFT COUPLING
Filed Feb. 10, 1937 2 Sheets-Sheet 2
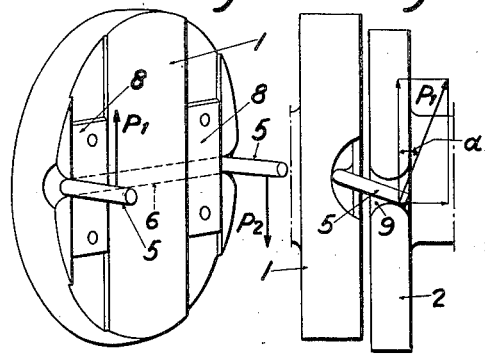
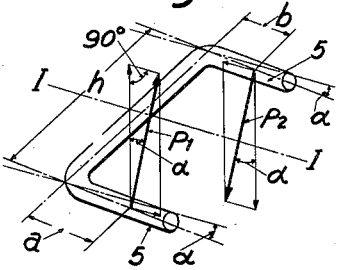
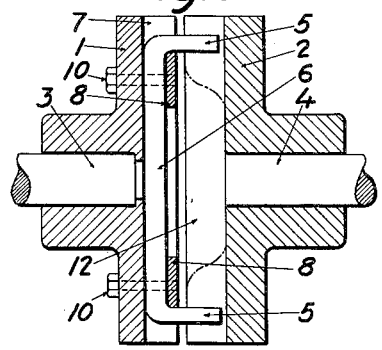
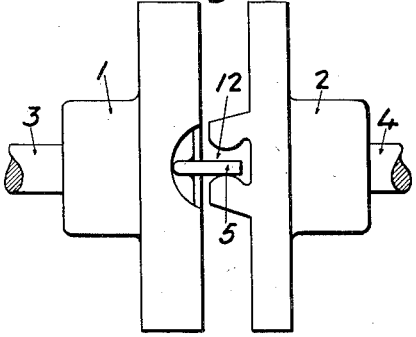
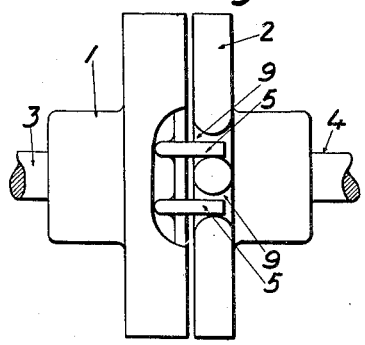
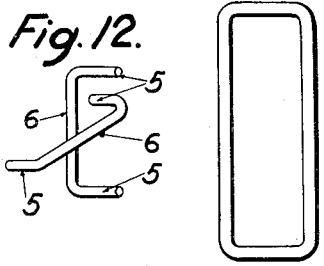
INVENTOR:
ERNST MALCUS ÅGREN
BY Haseltine Lake & Co.
ATTORNEYS Patented Feb. 28, 1939

2,148,975

UNITED STATES PATENT OFFICE 2,148,975

FLEXIBLE SHAFT COUPLING

Ernst Malcus Ågren, Stockholm, Sweden

Application February 10, 1937, Serial No. 125,027
In Sweden February 12, 1936

6 Claims. (Cl. 64—10)

The present invention relates to improvements in a flexible shaft coupling, which without breaking stresses transmits torsional moments from one shaft to the other, in case the shafts should not be coaxial on account of aligning errors or for some other reason. The construction of the coupling is such that it tolerates considerable deviations from the coaxial positions of the shafts by changes of the positions between the coupling halves or members mutually while the transmitted torsional moment remains constant at these changes of the positions. It also admits of axial displacements between the shafts mutually. Moreover, the construction is very simple and can be exactly calculated and dimensioned for the amounts of power to be transmitted.

In flexible couplings hitherto known the torsional moment is transmitted from one coupling member to the other by means of one or several coupling elements, such as claws, pins, springs or the like, which are so arranged that it is very difficult to calculate and dimension them with respect to the stresses caused by aligning errors because the changes of the positions of the coupling members mutually produced by the said errors occasion additional stresses which are very difficult to exactly determine.

Another important advantage of the coupling according to this invention in comparison with older flexible couplings is that when the shafts are to be moved apart it is not necessary to displace one of them axially although this is also possible but the disengaging may take place in a most simple way exclusively by radial displacement as in many cases the axial displacement requires an awkward and tedious dismantling of the machinery connected to the shaft.

Some embodiments of the object of the invention are illustrated in the accompanying drawings.

Figures 1 to 5 show one embodiment in Figures 1 and 4 in lateral elevation in the last mentioned figure turned a quarter of a revolution from the position shown in Figure 1, while Figure 2 shows the right coupling member in Figure 1 viewed from the left.

Figure 3 shows the left coupling member in Figure 1, viewed from the right.

Figure 5 is an axial section through the coupling.

Figures 6, 7, and 8 illustrate the mode of operation.

Figure 9 shows an axial section of a second embodiment.

Figure 10 is the same embodiment turned a quarter of a revolution from the position shown in Figure 9.

Figure 11 is a third embodiment in the same position as the one shown in Figure 10.

Figures 12 and 13 are modified details.

As usual, the coupling has two main halves or members 1, 2, each member being embodied as a flange or disc and adapted to be secured to its respective shaft 3, 4.

According to the invention the said coupling members are connected mutually by means of a coupling element 5, 6 which is mounted hingedly in one coupling half, the member 1 in the drawings, and engages the other coupling half in such a way that the element can move axially and radially in relation to the last mentioned coupling half and, thus, transmit the torsional moment without being subjected to breaking stresses in case the two shafts are not coaxial. This element, below called driving member, consists of a stirrup having preferably a round cross section and substantially U-shape. The said driving member is hingedly mounted to the coupling half 1, for example by its waist being inserted in a groove 7 and there held in position by screwed-on bearing plates or the like 8 which are provided in recesses so that they are at a level with the surface of the coupling half 1 facing the second coupling half 2. Each leg 5 of the driving member engages with a suitable play its groove 9 in the coupling half 2, as is clear from Figures 1 to 5. In order to avoid the breaking stresses between the driving member and the coupling half 2 the walls of the two grooves are rounded, see for example Figure 4, so that in all positions which can arise during the run each leg 5 contacts the groove wall at one point only at every moment of the rotation of the coupling.

Assuming Figure 7 to represent the mutual positions of the coupling halves 1, 2 prior to the start and an oblique position of the said members on account of aligning errors the mutual positions of the coupling halves 1 and 2 in the direction of rotation being supposed to be such that the two stirrup legs 5 rest against the lower edge of its groove 9 and the coupling half 2 begins to rotate, for example in clockwise direction, viewed from the right in Figure 7, the consequence will be that the engaging leg 5 visible in Figure 7 will be turned upwards in the hinge until contact arises between the other leg 5 not visible in Figure 7 and the upper side of the respective groove. From this moment the torsional moment is transmitted from the coupling half 2 to the coupling half 1 by the forces $P_1$ and $P_2$ in the manner indicated diagrammatically in Figure 6. As the powers $P_1$ and $P_2$ are directed in opposite directions the driving member will not subsequently be subjected to any upsetting tendency. Of course, the procedure becomes fundamentally the same if the power transmission takes place in the opposite direction, that is from the shaft 1 to the shaft 2.

In order to make the power distribution in the coupling at the transmission of the torsional moment clear reference is made to Figure 8. The generic case is now supposed that the shafts are not coaxially aligned.

Whether the aligning error results in the center lines of the shafts being parallel but lying in different planes, see Figure 7, in which, for the sake of simplicity, the error is shown exaggerated, or in the center lines crossing each other the legs of the driving member will deviate in certain positions from the ideal axial plane together with which the driving member should rotate if the shafts were completely coaxial. This deviation, which here is indicated by the angle $\alpha$ varies two times between 0 and a maximum value each time the coupling has performed one revolution, no matter how the error is, as at all events the driving member passes two positions during one revolution, in which positions a plane through the legs of the driving member also contains the center lines of the two shafts.

Due to the grooves in the flange of one coupling half being so shaped for the self-adjustment of the driving member that at each moment of the rotation each leg is in contact with the groove wall at one point only the said flange will act upon the driving member with two powers $P_1$ and $P_2$ which are always directed perpendicularly to the center lines of the legs. The said powers attack the legs at a distance $a$ and $b$ respectively from the waist of the driving member, the said distance varying according to the angle $\alpha$. If there are angle errors between the shafts the levers $a$ and $b$ become unequal even in the position during the rotation in which $\alpha=0$.

Although the powers $P_1$ and $P_2$ and the positions of their points of application on the legs always vary as soon as there is an error in the aligning of the shafts the said powers and their influence determining the strength of the driving member can be exactly calculated at each moment of the motion because the vital member of the coupling, viz., the driving member, according to the principle of this invention with respect to the powers acting upon the same, constitutes a statically determined system.

The calculation of the powers $P_1$ and $P_2$ is made in the following manner:

If the torsional moment to be transmitted from one coupling half to the other is indicated by $M_v$ it is clear from the figure that the components of $P_1$ and $P_2$, which are perpendicular to the axis I—I, together are to exert an equal torsional moment around the axis I—I.

$$\therefore M_v = \frac{h}{2} \cos \alpha (P_1 + P_2)$$

From the conditions of equilibrium of the driving member the following is obtained:

$$P_1 a = P_2 b; \therefore P_2 = \frac{a}{b} P_1$$

$$\therefore M_v = \frac{h}{2} \cdot P_1 \cdot \cos \alpha \left(1 + \frac{a}{b}\right)$$

$$\therefore P_1 = \frac{M_v}{\frac{h}{2} \cos \alpha \left(1 + \frac{a}{b}\right)}$$

If $a = b$ then:

$$P_1 = \frac{M_v}{h \cdot \cos \alpha} \text{ and } P_2 = P_1$$

If moreover $\alpha = 0$ then:

$$P_1 = P_2 = \frac{M_v}{h}$$

In the cases occurring in practice the maximum value of the angle $\alpha$ might be very small, in general below a few degrees, on account of which as a rule one can put $\cos \alpha \cong 1$; the error arising hereby is below $\tfrac{1}{10}$ percent and thus it does not influence practical dimensioning.

$$\therefore P_1 \cong \frac{M_v}{\frac{h}{2}\left(1 + \frac{a}{b}\right)}$$

The torsional moment $M_t$ determining the dimensioning of the engaging member is:

$$M_t = P_1 a \cong \frac{M_v a}{\frac{h}{2}\left(1 + \frac{a}{b}\right)}$$

$$\therefore M_t \cong \frac{M_v \cdot ab}{\frac{h}{2}(a+b)}$$

Thus, from the above it is clear that on account of the engaging system being statically determined it is always possible exactly to determine the stresses arising in the coupling in case of a certain optional shaft error and that for the quantity of such errors, which generally occurs in practice, the dimensioning is very easily done.

Without changing the dimension of the material of the driving member it is possible to vary the transmitted moment only by altering the distance between the legs 5 of the member. By altering the same distance it is possible also to make the coupling more or less elastic. The same result can be reached by changing the lengths of the legs.

When the shafts together with their coupling halves are to be moved apart, it is not necessary, as already pointed out in the preamble of this specification, to effect such displacement in axial direction. Instead, one shaft or the other, together with its coupling half is moved radially. If the coupling is constructed in accordance with, for example, Figures 1–5, this may be done after the screws 10 having been removed and the bearing plates 8 having been moved out of the way of the driving member 5, 6, so that the latter is able to slide out of its groove. If the coupling is constructed according to Figure 9, in which the grooves 9 are united to a diametrical groove 12, the displacement also in this case may be effected radially and without the bearing plates being unfastened. Of course, the grooves 9 may be provided in projections, so that diametrically passing grooves are not required. The said projections are marked by dash-and-dot lines in Figure 9. In both these cases the grooves may be shaped in accordance with Figure 10. In order to increase the power transmitting capacity a plurality of driving members may be provided, either parallel with each other or crossing each other according to Figure 11 and 12, respectively, which indicate embodiments provided with two driving members. Finally, the driving member may be made completely closed, as shown in Figure 13, or be replaced by a substantially rectangular plate, provided with suitable bearing pins or the like along one side so that it can be definitely and hingedly mounted to one coupling half.

The details of the coupling may be varied also in other respects within the scope of the invention.

Having now described my invention, what I claim as new and desire to secure by Letters Patent is:

1. A flexible shaft coupling, comprising two coupling halves, at least one unitary power transmitting yoke member having substantially parallel axial legs and connecting or coupling said halves by being movably mounted in one of said halves and directly engaging in grooves in the other half on either side of the axis of the shaft of the coupling by means of said axial legs which are disposed so as to be generally movable axially and radially in the grooves, each of said legs having a circumferential play in its groove and each of said grooves having convex rounded walls facing each other.

2. A flexible shaft coupling according to claim 1, having several unitary power transmitting members parallel to each other.

3. A flexible shaft coupling according to claim 1, having several unitary power transmitting members, of which at least one of them crosses another.

4. A flexible shaft coupling according to claim 1, in which the unitary power transmitting member is substantially U-shaped and has circular cross-section.

5. A flexible shaft coupling according to claim 1, in which the legs of the transmitting member are connected to each other so that the transmitting member constitutes a substantially rectangular closed and rigid member.

6. A flexible shaft coupling according to claim 1, having a plurality of distinct unitary power transmitting members with the legs thereof parallel to each other.

ERNST MALCUS ÅGREN.